(No Model.) 2 Sheets—Sheet 2.

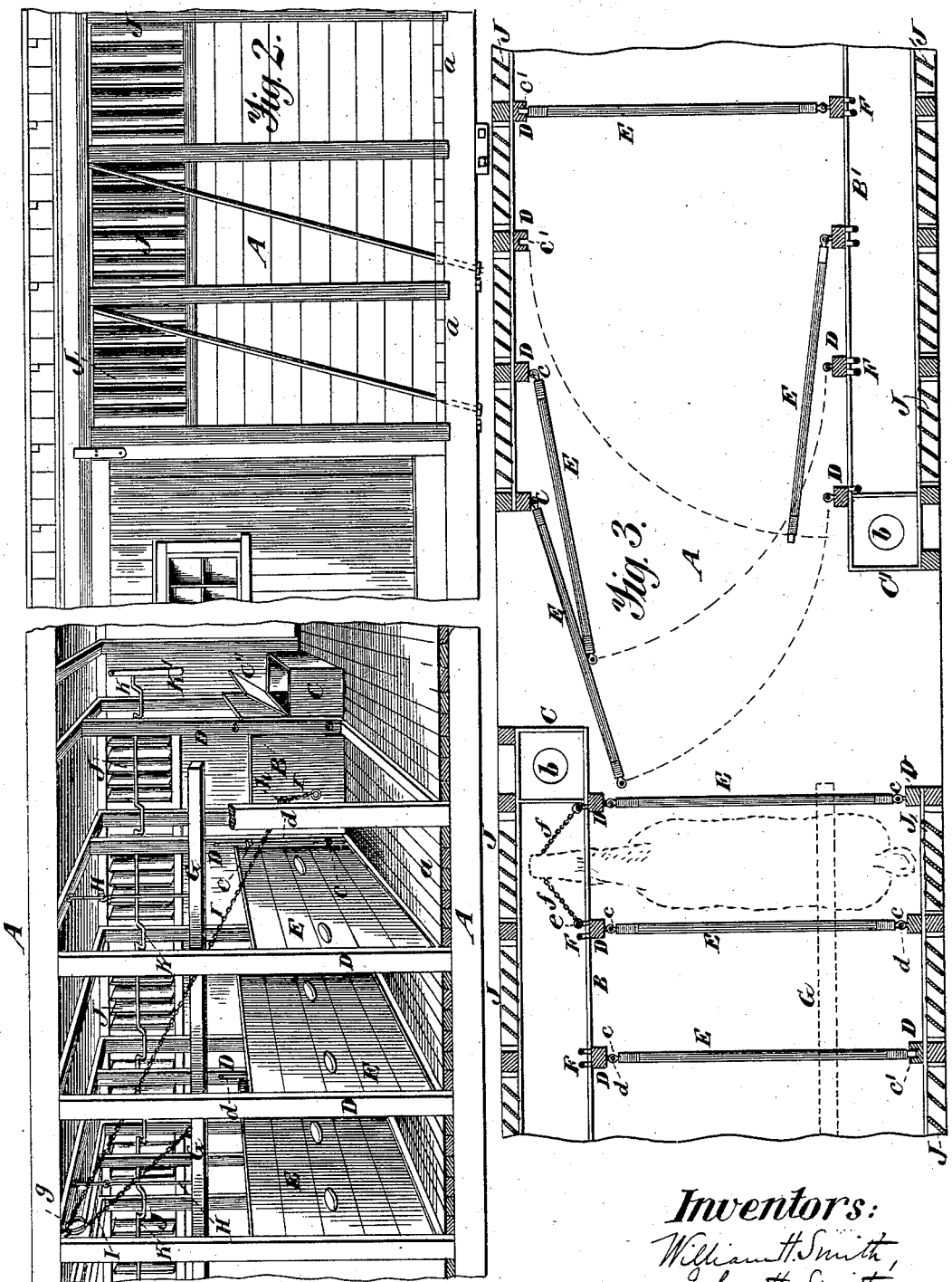

W. H. & J. H. SMITH & H. ARMS.
STOCK CAR.

No. 308,808. Patented Dec. 2, 1884.

Witnesses:
A. Ruppert,
E. Cruse

Inventors:
William H. Smith,
John H. Smith,
Harrison Arms,
by Gett & W. J. Howard, attys

United States Patent Office.

WILLIAM H. SMITH AND JOHN H. SMITH, OF HILLSDALE, MICHIGAN, AND HARRISON ARMS, OF TOLEDO, OHIO, SAID W. H. AND J. H. SMITH ASSIGNORS TO SAID ARMS.

STOCK-CAR.

SPECIFICATION forming part of Letters Patent No. 308,808, dated December 2, 1884.

Application filed June 16, 1884. (No model.)

*To all whom it may concern:*

Be it known that we, WILLIAM H. SMITH and JOHN H. SMITH, residing at Hillsdale, in the county of Hillsdale and State of Michigan, and HARRISON ARMS, a citizen of the United States, residing at Toledo, in the county of Lucas and State of Ohio, have invented certain new and useful Improvements in Stock-Cars, of which the following is a specification, reference being had to the accompanying drawings, and to the letters of reference marked thereon.

The principal objects of our invention are to facilitate the shipping of horses or other animals in cars; to enable the attendant to conveniently and efficiently care for them during transportation, whether the car is moving or standing; to provide means for holding enough grain and water to supply the animals for several days without interfering with the space necessary for ingress or egress; to prevent the violent throwing of the animals against the partitions or sides of the stalls upon the starting or stopping of the cars, and the consequent bruising of the animals; to allow the stalls to be opened and closed, whereby to permit the animals to pass in and out in orderly succession, and to enable the stalls to be closed successively after they are filled; to limit the side movement of the heads of the horses, so that they cannot reach the adjacent animal, thus preventing the animals from biting each other; to prevent the kicking of the horses; and, lastly, to regulate the ventilation of the car.

Other advantages attending the use of our invention will be found to exist.

Figure 4:
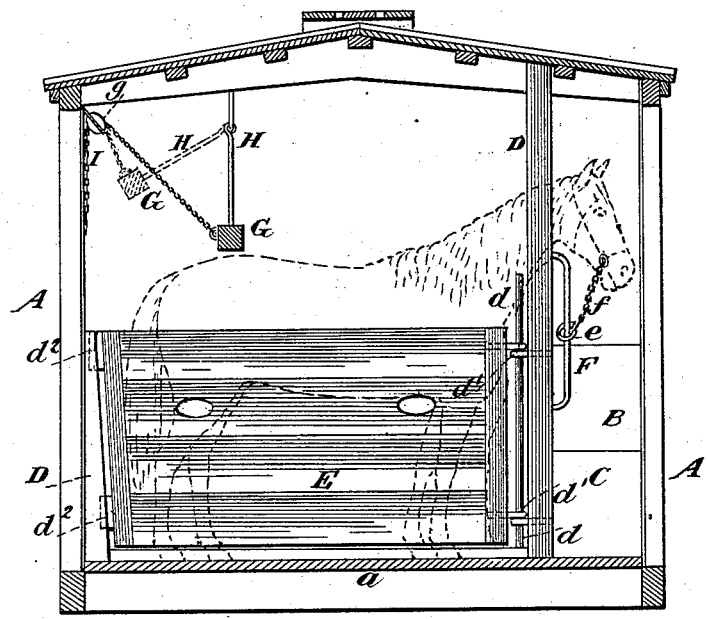
Figure 5:
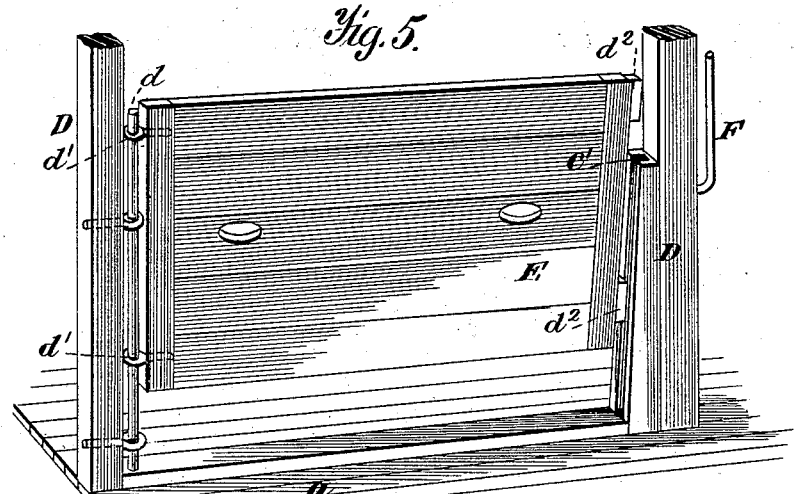
Figure 6:
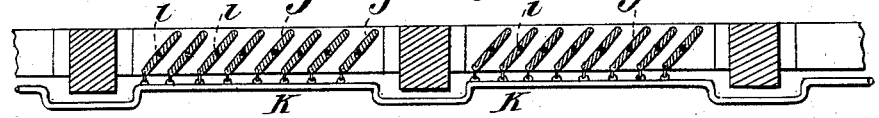

In the accompanying drawings, Figure 1 is a perspective interior view, Fig. 2 a side elevation, and Fig. 3 a sectional plan, of a portion of the car. Fig. 4 is a vertical transverse section of the car. Figs. 5 and 6 are detached details, hereinafter referred to.

Similar letters of reference indicate similar parts in the respective figures.

A is the frame-work of the car, which may be of any suitable known construction.

B is a manger or trough located at one side of the car, running longitudinally thereof, preferably from a point a little to one side of one edge of the door-opening to one end of the car. B' is a similar manger, correspondingly arranged at the opposite side of the car. The mangers B B' are raised about two feet above the floor $a$ of the car, the spaces below the mangers being occupied by tanks C C', for holding water. The tanks C C' each extend from an edge of the door-opening, or beyond the points where the troughs B B' begin, to the end of the car, and are each provided with a lid, C'', preferably hinged and provided with a central opening, $b$.

D D are stanchions or posts placed apart a distance equal to the width desired for the stalls.

E E are the partitions which form the stalls, said partitions being hinged at $c$ to the stanchions or posts D. The stalls are made narrow— say about twenty-eight inches in width—so that the nearness of each horse's side to the partitions of the stall will prevent the horse from being thrown with sufficient force against the stall to bruise him. The partitions E are about four feet and a half in height, or low enough to clear the hips of the animals. The partitions E are hinged to rods $d$, situated at the lower part of the stanchions, the hinges being formed by means of rings or similar devices, $d'$, which will turn and slide vertically upon said rods $d$. Each of the partitions may be secured to the stanchion opposite to that to which it is hinged by tongues $d^2$, fitting in a groove, $c'$, cut in said opposite stanchion, the arrangement being that upon raising the partition and dropping it into the groove or notch of the opposite stanchion the partition will be firmly held when closed. (See Figs. 4 and 5.)

Certain of the partitions, particularly those nearest the doors, may be hinged at each end to a rod, $d$, so that by removing either rod the partition can be swung or turned upon the opposite rod. We prefer this latter mode of hinging the partitions, as by its use the partition can be swung either way for greater ease in the admission or egress of the horses or other animals.

The objection heretofore to low partitions has been because of the liability of the horses to bite each other and the danger of their kicking across the partitions. We avoid accidents of this nature by attaching rods F, about two feet in length, to those stanchions which are adjacent to the mangers, said rods F being preferably at that side of the stanchion which confronts the manger. Rings e are placed upon the said rods F, which slide freely thereon, and to said rings are attached hitching straps or chains f, to which the head of the horse is hitched, as shown in Figs. 3 and 4. The length of the hitching straps or chains is such as to prevent the horse moving his head laterally beyond the limit of his stall, whereas the sliding rings to which the secured ends of the straps or chains are attached will allow the horse to move his head up and down freely.

To prevent the kicking of the horses, a beam, G, is placed over the rumps of the animals, as shown in Figs. 3 and 4, said beam being suspended from the roof by means of linked rods or chains H. The kicking-beam can be lifted or lowered by means of the cord I, which passes over a sheave, g, the other end of the cord being secured to one of the stanchions, as shown at h.

The ventilating of the car is effected by the use of the following construction and devices, (shown particularly in the detached Fig. 6.) A part of each outer side wall of the car above the mangers is perforated or provided with windows, in which are hung slats J, vertically pivoted on pivots i. Each series of slats is connected in a well-known manner by a longitudinal rod, K, which in turn is connected to a lever, K', hung to the side of the car near the door, so that the entire series of slats may be opened or closed, or simultaneously moved in the desired direction, by the attendant. By our arrangement of tanks space is materially economized. The water is taken from the tanks C C' by the attendant by passing the bucket through the opening b and dipping up the water, which is carried to the animals, the attendant passing along the manger in front of the horses.

It is believed that the features of improvement constituting our invention, and above described, meet wants long felt in the construction of stock-cars.

The most important points of improvement have been hereinbefore specifically mentioned; but it is believed that by our invention the general construction of cars of this class is improved in ways not particularized, and that the value of cars of this class is greatly enhanced.

Having described our invention, we claim—

1. In a stock-car, the combination and arrangement above the floor of the car of an upper feed-trough or manger and a lower water-tank, both running longitudinally of the car, the manger being placed directly above and upon the tank, substantially as set forth.

2. The combination, in a stock-car and arrangement above the floor thereof, of a water-tank and a feed-trough or manger placed over and directly upon the water-tank, the latter projecting at one end beyond the feed-trough, substantially as set forth.

3. The combination, in a stock-car, of a water-tank resting upon the floor thereof, and a feed-trough or manger placed above and upon the tank, both running longitudinally at a side of the car from or near an edge of the door-opening of the car, substantially as set forth.

4. The combination, in a stock-car and arrangement at either side thereof, of a water-tank resting upon the floor of the car, and a feed-trough or manger, the latter placed above and upon the former, each pair—viz., a feed-trough and a water-tank—beginning at one side of the car at or near the edge of the door-opening at that side of the car, and each pair running longitudinally in an opposite direction to an end of the car, substantially as set forth.

5. In a stock-car, a water-tank arranged at the side of the car and running longitudinally thereof, having at one end an opening through which a bucket can be placed for supplying or dipping out water, substantially as set forth.

6. In a stock-car, a series of stanchions having hinging-rods, and a series of partitions having hinging-rings surrounding said rods, combined with a series of oppositely-arranged grooved stanchions, whereby the partitions may be swung upon their hinges and lifted and placed in the grooves of said opposite series of stanchions, substantially as set forth.

7. In a stock-car, the combination, with a series of stalls, of a kicking-beam extending transversely thereof, substantially as set forth.

8. In a stock-car, a series of stalls combined with a kicking-beam extending transversely of the same, and adapted to be raised or lowered or secured at the desired height, substantially as set forth.

9. A stock-car having longitudinal water-tanks and feed-troughs, and having its wall or walls above the feed-troughs provided with windows, combined with a series of pivoted slats arranged in said windows, and means for opening, closing, or adjusting the series of slats, substantially as set forth.

10. A stock-car having longitudinal water-tanks and feed-troughs, and having its walls above the feed-troughs provided with windows, combined with a series of slats arranged in said windows upon vertical pivots, a rod connecting the series of slats, and a lever for operating the rod, substantially as set forth.

In testimony whereof we affix our signatures in presence of two witnesses.

WILLIAM H. SMITH.
JOHN H. SMITH.
HARRISON ARMS.

Witnesses:
  GEO. A. JANES,
  VIRGIL P. IRONS.